US009910930B2

(12) United States Patent
Shang et al.

(10) Patent No.: US 9,910,930 B2
(45) Date of Patent: Mar. 6, 2018

(54) SCALABLE USER INTENT MINING USING A MULTIMODAL RESTRICTED BOLTZMANN MACHINE

(71) Applicant: TCL RESEARCH AMERICA INC., San Jose, CA (US)

(72) Inventors: Yue Shang, San Jose, CA (US); Lifan Guo, San Jose, CA (US); Wanying Ding, San Jose, CA (US); Xiaoli Song, San Jose, CA (US); Mengwen Liu, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 493 days.

(21) Appl. No.: 14/587,727

(22) Filed: Dec. 31, 2014

(65) Prior Publication Data

US 2016/0188726 A1 Jun. 30, 2016

(51) Int. Cl.
*G06F 17/30* (2006.01)

(52) U.S. Cl.
CPC .............................. *G06F 17/30967* (2013.01)

(58) Field of Classification Search
CPC ............................................... G06F 17/30967
USPC ........................................................ 707/706
See application file for complete search history.

(56) References Cited

U.S. PATENT DOCUMENTS

| | | | |
|---|---|---|---|
| 9,047,271 B1* | 6/2015 | Mengibar | G06F 17/2765 |
| 9,189,549 B2* | 11/2015 | Rubinstein | G06Q 30/0601 |
| 2009/0182725 A1* | 7/2009 | Govani | G06F 17/30864 |
| 2010/0228694 A1* | 9/2010 | Le Roux | G06N 3/08 706/25 |
| 2011/0131157 A1* | 6/2011 | Iyer | G06Q 30/0251 706/12 |
| 2011/0161311 A1* | 6/2011 | Mishne | G06F 17/3064 707/719 |
| 2012/0209751 A1* | 8/2012 | Chen | G06Q 30/06 705/27.2 |
| 2012/0317088 A1* | 12/2012 | Pantel | G06F 17/30893 707/706 |

(Continued)

FOREIGN PATENT DOCUMENTS

| | | |
|---|---|---|
| CN | 103593474 A | 2/2014 |
| CN | 103838836 A | 6/2014 |

*Primary Examiner* — Thanh-Ha Dang
(74) *Attorney, Agent, or Firm* — Anova Law Group, PLLC

(57) ABSTRACT

A method for scalable user intent mining is provided. The method includes detecting named entities from a plurality of query logs in a public query log dataset and generating features of the plurality of query logs based on the detected named entities. The method also includes applying a multimodal restricted boltzmann machine (RBM) on the generated features of the plurality of query logs to train a public multimodal RBM and generating a plurality of public query representations. Further, the method includes receiving a search query from a user, determining whether there are a plurality of history queries of the user. When there is no history query, user intent is predicted using the public multimodal RBM. When there are the history queries, the public multimodal RBM is applied on the plurality of history queries to train a personalized multimodal RBM, and the user intent is predicted using the personalized multimodal RBM.

18 Claims, 6 Drawing Sheets

(56) References Cited

U.S. PATENT DOCUMENTS

| | | | |
|---|---|---|---|
| 2013/0006914 A1* | 1/2013 | Ray | G06N 5/02 706/50 |
| 2013/0144854 A1* | 6/2013 | Pantel | G06F 17/30867 707/706 |
| 2013/0173650 A1* | 7/2013 | Marantz | G06F 17/30864 707/767 |
| 2013/0282704 A1* | 10/2013 | Pantel | G06F 17/30867 707/723 |
| 2014/0309993 A1* | 10/2014 | Goussard | G10L 15/063 704/231 |
| 2016/0071024 A1* | 3/2016 | Amer | G06N 99/005 706/12 |
| 2016/0099854 A1* | 4/2016 | Swaminathan | H04L 67/22 709/224 |
| 2016/0217522 A1* | 7/2016 | Jnagal | G06Q 30/0627 |
| 2017/0011112 A1* | 1/2017 | Jing | G06F 17/30864 |

\* cited by examiner

SCALABLE USER INTENT MINING USING A MULTIMODAL RESTRICTED BOLTZMANN MACHINE

FIELD OF THE INVENTION

The present invention generally relates to the field of information technology and user interface technologies and, more particularly, to methods and systems for scalable user intent mining.

BACKGROUND

Nowadays, search engines have become indispensable parts of modern human life, which create hundreds and thousands of search logs every second throughout the world. With explosive growth of online information, a key issue for web search service is to better understand user's needs through short search queries to match the user preference as much as possible. The search engines play an important role in human life, and they have greatly facilitated people's daily lives through providing information to the user.

However, it may be difficult for machines to understand what people are looking for. Due to lack of personal information in some scenarios and huge calculation required when seeking for a relevant user group, a personalized search becomes a challenging problem. Different people may have different interests. Even for a single user, the user's interest may change over time. Thus, it may be necessary for online search services to meet the need of personalized searching and to adapt to the change of user intent over time. As a result, user specific information (e.g. user profile, user query history, previous view content information, etc.) becomes significant for identifying the user's interest.

The disclosed methods and systems are directed to solve one or more problems set forth above and other problems.

BRIEF SUMMARY OF THE DISCLOSURE

One aspect of the present disclosure includes a method for scalable user intent mining. The method includes detecting named entities from a plurality of query logs in a public query log dataset and generating features of the plurality of query logs based on the detected named entities. The method also includes applying a multimodal restricted boltzmann machine (RBM) on the generated features of the plurality of query logs to train a public multimodal RBM and generating a plurality of public query representations. Further, the method includes receiving a search query from a user, determining whether there are a plurality of history queries of the user. When there is no history query, user intent is predicted using the public multimodal RBM. When there are history queries, the public multimodal RBM is applied on the plurality of history queries to train a personalized multimodal RBM, and the user intent is predicted using the personalized multimodal RBM.

Another aspect of the present disclosure includes a system for scalable user intent mining. The system includes a named entity detection unit configured to detect named entities from a plurality of query logs in a public query log dataset and a feature generation unit configured to generate features of the plurality of query logs based on the detected named entities. The system also includes a public multimodal restricted boltzmann Machine (RBM) learning unit configured to apply a multimodal RBM on the generated features of the plurality of query logs in the public query log dataset to generate a plurality of public query representations and a personal model learning module configured to apply the public multimodal RBM on the plurality of history queries of the user to train a personalized multimodal RBM. Further, the system includes an intent mining module configured to predict user intent using one of the public multimodal RBM and the personalized multimodal RBM.

Another aspect of the present disclosure includes a computer readable storage medium storing computer-executable instructions to execute operations for scalable user intent mining. The instructions include detecting named entities from a plurality of query logs in a public query log dataset and generating features of the plurality of query logs based on the detected named entities. The instructions also include applying a multimodal restricted boltzmann machine (RBM) on the generated features of the plurality of query logs to train a public multimodal RBM and generating a plurality of public query representations. Further, the instructions include receiving a search query from a user, determining whether there are a plurality of history queries of the user, applying the public multimodal RBM on the plurality of history queries of the user to train a personalized multimodal RBM when there are a plurality of history queries of the user, and predicting user intent using one of the public multimodal RBM and the personalized multimodal RBM.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
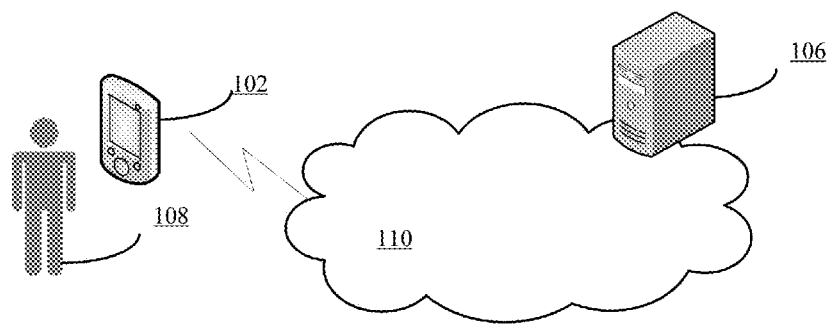
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a terminal 102, a server 106, a user 108 and a network 110.

Terminal 102 (also known as the terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. Terminal 102 may be implemented on any appropriate computing platform. Terminal 102 may be used by user 108 to connect to network 110 and make requests to server 106. The terminal 102 may obtain webpages from any appropriate sources, such as from a local storage device, from a wired or wireless network device of a service provider, or from the Internet.

Further, the server 106 may refer to one or more server computers configured to provide certain web server functionalities (e.g., search server). The server 106 may include one or more processors to execute computer programs in parallel. The server 106 may store webpages to be access by terminals, and each of these webpages has a unique web address. The unique web address is also called Uniform Resource Locator (URL). Terminal 102 and server 106 may communicate with each other through communication network 110, such as a cable network, a phone network, and/or a satellite network, etc. Although one terminal 102 and one server 106 are shown in FIG. 1, any number of terminals and/or network devices may be included.

Figure 2:
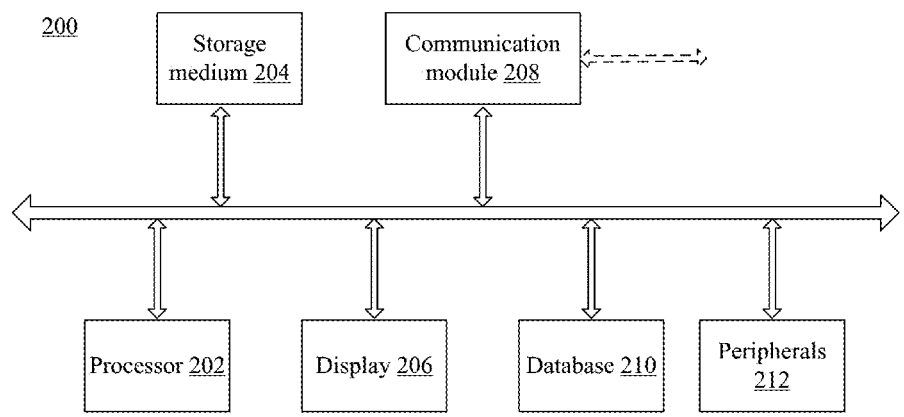
FIG. 2 illustrates an exemplary computing system consistent with the disclosed embodiments.

Terminal 102, and/or network device 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
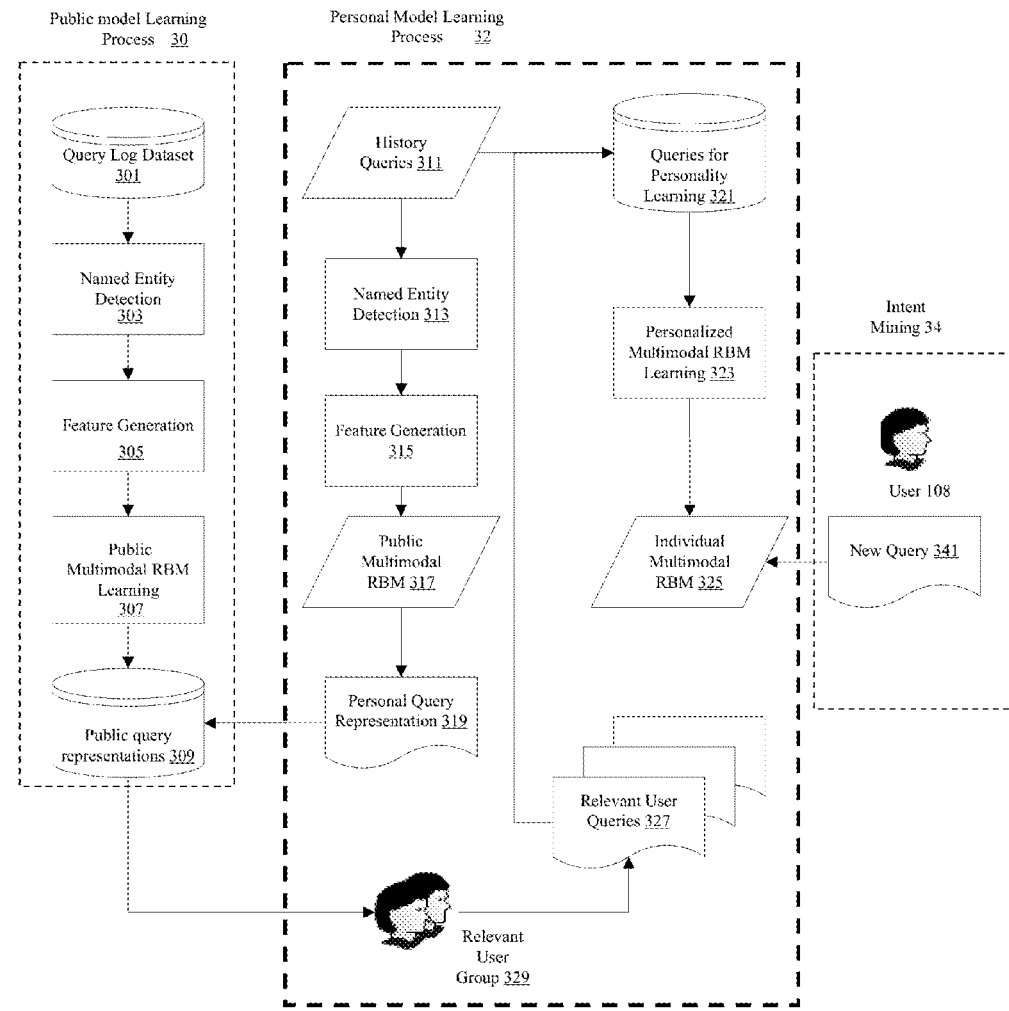
FIG. 3 illustrates a structure schematic diagram of an exemplary scalable multimodal learning system consistent with the disclosed embodiments.

Terminal 102 may provide requests to server 106 based on at least one user query from the user 108, and server 106 may respond with the received requests. FIG. 3 illustrates a structure schematic diagram of an exemplary scalable multimodal learning system consistent with the disclosed embodiments.

As shown in FIG. 3, the scalable multimodal learning system 300 may include a public model learning module 30, a personal model learning module 32, and a user intent mining module 34. Certain components may be omitted and other components may be added.

The public model learning module 30 may be configured to implement a public model learning process that learns general representations (i.e., representations of public data) from a large query log dataset and learns parameters of the public model. The public model learning process may only need to run one time.

The public model learning module 30 may include a query log dataset 301, a named entity detection unit 303, a feature generation unit 305, and a public multimodal restricted boltzmann machine (RBM) learning unit 307. Certain components may be omitted and other components may be added. Various components in the public model learning module 30 may be implemented in hardware, software, or a combination of hardware and software.

The query log dataset 301 may be configured to store search engine query logs from websites (e.g., Google search, Microsoft Bing search, Yahoo! search, etc.). Compared to other resources (e.g., tweets, blogs, etc.), the search engine query logs can more directly reflect users' interests and needs. The query log may include user sessions, user ids, queries, query terms, a set of uniform resource locators (URLs) for each query, domains, URL rankings, and so on.

The named entity detection unit 303 may be configured to detect named entities from a plurality of query logs in a public query log dataset 301. The users may tend to use brief and direct words to describe users' needs when the users use the search engine. Mostly, the users may use named entities to describe the users' needs. In domains of data mining, a named entity refers to a phrase that clearly identifies an item from other items having similar attributes. Examples of named entities include location, a person's first and last name, address, a product's name, etc. Different users may search different aspects of the named entities, but it's difficult for the search engine to tell the users' exact search intent. Query logs from the search engine may provide huge amount of user search information. For example, nearly 70% of query logs contain single named entities (e.g. "Gone girl trailer"). These named entities cover varies categories of the named entities, such as movies, music, books, autos, electronic products, and so on.

The feature generation unit 305 may be configured to generate features of the plurality of query logs based on the detected named entities. The features are descriptors or characteristic attributes of words designed for describing query feature vectors. For example, features for word count are bag-of-words.

The public multimodal RBM learning unit 307 may be configured to apply a multimodal RBM on the generated features of the plurality of query logs in the public query log dataset 301 to generate a plurality of public query representations 309. For example, the representations may be bag-of-features (e.g., bag-of-words for the query text).

The personal model learning module 32 may be configured to apply the public multimodal RBM on a plurality of history queries of user 108 to train a personalized multimodal RBM when there are the plurality of history queries of the user 108. The personal model learning module 32 implements a personalized model learning process. When the user 108 submits a query, if there is history data (i.e., history queries) for the user's online activity, the system can try to learn a personal model.

First, the personal data can be represented by the general representations using the public model learned from a public query log dataset. That is, the system 300 can calculate the similarities between the representations of personal data and the representations of public data, and find the most similar queries. According to the multimodal RBM model, the similar query representations refer to similar queries and similar click information. Thus, it is assumed that users (i.e., relevant users) sharing similar query representations have similar interest(s).

Therefore, the queries from these users can be collected and be combined with this user's personal information to train a personalized multimodal RBM model. The personalized multimodal RBM model may reflect the user's interest because the personalized multimodal RBM model is trained from the user's history queries and the queries of the relevant users having the similar interest(s).

For example, relevant users may include the users who have inputted a same query or similar queries within a pre-defined period of time (e.g., past hour). The more user history data is, the less bias it can have when looking for similar users and the more accuracy the personalized multimodal RBM model can be. Further, the personalized multimodal RBM model can choose the latest M queries of the user's history data (M is an integer greater than 1) within the pre-defined period of time, so it can also reflect the user's interest changing over time. If there's no history data of the user 108, the system can learn the user intent from the public model generated from the public query log dataset.

The personal model learning module 32 may include history queries 311, a named entity detection unit 313, a feature generation unit 315, a public multimodal RBM unit 317, a personal query representation unit 319, queries for personality learning 321, a personalized RBM learning unit 323, and an individual multimodal RBM unit 325. Relevant user queries 327 and relevant user group 329 may be shown in FIG. 3. Certain components may be omitted and other components may be added. Various components in the personal model learning module 32 may be implemented in hardware, software, or a combination of hardware and software.

The named entity detection unit 313 may be configured to detect named entities of the history queries 311 of the user 108. The feature generation unit 315 is similar to the feature generation unit 305. The feature generation unit 315 may be configured to generate features of the plurality of history queries of the user 108 based on the detected named entities.

The public multimodal RBM unit 317 may be configured to generate personal query representations of the plurality of the history queries 311 of the user 108 using the public multimodal RBM learned from the public query log dataset. The queries for personality learning 321 may include a plurality of queries from the relevant users and the plurality of history queries 311.

The personalized multimodal RBM learning unit 323 may be configured to train the personalized multimodal RBM using the queries for personality learning 321. The relevant user queries 327 may be obtained by mapping relationships between the received public query representations from the plurality of public query representations and the relevant user group 329.

Further, the intent mining module 34 may be configured to predict user intent using the individual multimodal RBM unit 325 when a new query 341 is inputted by the user 108.

Figure 4:
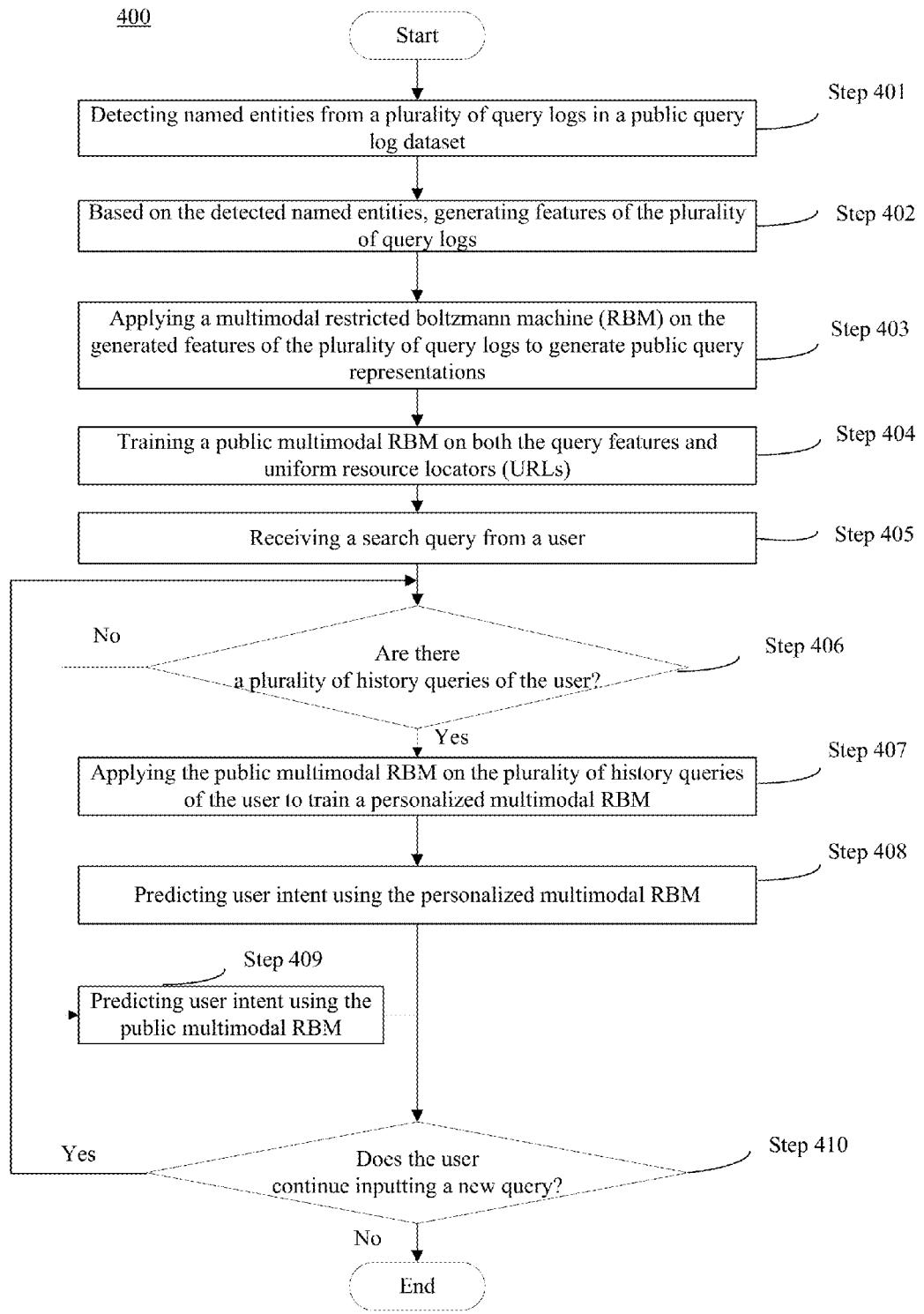
FIG. 4 illustrates a flow chart of an exemplary process for scalable user intent mining consistent with the disclosed embodiments.

In operation, the system for scalable user intent mining 300 may perform certain processes to predict the user intent (i.e., what the user is looking for). FIG. 4 illustrates a flow chart of an exemplary process 400 for scalable user intent mining consistent with the disclosed embodiments.

As shown in FIG. 4, at the beginning, the system 300 detects named entities from a plurality of query logs in a public query log dataset (Step 401).

During the detection of the named entities, a candidate named entity set is built by refining n-grams from the whole public query log dataset using Pointwise Mutual Information (PMI). The "n-gram" is a contiguous sequence of n items (e.g., word, word fragment, character, etc.) from a given sequence of text. The "named entity" referred is not same as a traditional NER (named entity recognition, also known as entity identification, entity chunking and entity extraction). The traditional NER task only looks at phrases that describe specific classes of items such as a person's name, an organization name, locations, etc. However, things that people are interested in are various, and it is easier to understand people's intent from a much larger range of the named entities. A general statistical based method can be designed to learn possible named entities mentioned by people in the query logs.

First, word count of all n-grams in the query log dataset (n is an integer less than or equal to 7) can be obtained. The n-grams whose word count is greater than S are kept. Thus, a candidate named entity set C can be obtained. The named entities in the candidate named entity set C may have overlaps. For example, a named entity p with 2 words can be part of the named entity q with 4 words. Then, mutual information in information theory can be used to measure if p and q are both named entities that refer to two dependent items, or p is incomplete description of q. The mutual information is a measure of the variables' mutual dependence. The mutual information determines whether p and q are dependent items (like "Harry Potter" is a person's name and "Harry Potter and the Goblet of Fire" is a book name), or not (e.g., "The Lord of the Rings: The Return of the King" and "The Return of the King", both refer to the movie).

To obtain the mutual information, PMI can be used to measure similarity of two candidate entities $M_1$ and $M_2$ with overlaps. Pairs with the larger PMI value can be regarded as one item and the smaller one can be removed from the candidate set. Provided that the two candidate named entities $M_1$ and $M_2$ are two random variables, PMI of $M_1$ and $M_2$ is defined by:

$$PMI(M_1, M_2) = \log_2\left(\frac{P(M_1 \cap M_2)}{P(M_1) * P(M_2)}\right) = \log_2\left(\frac{\frac{C(M_1 \cap M_2)}{N}}{\frac{C(M_1)}{N} * \frac{C(M_2)}{N}}\right) \quad (1)$$

where $P(M_1 \cap M_2)$ is a probability that $M_1$ and $M_2$ co-occur.

If $M_1$ and $M_2$ are statistically independent, then the probability that $M_1$ and $M_2$ co-occur is given by a product $P(M_1)*P(M_2)$. If $M_1$ and $M_2$ are not independent, and $M_1$ and $M_2$ have a tendency to co-occur, then $P(M_1 \cap M_2)$ can be greater than $P(M_1)*P(M_2)$. Therefore, a ratio between $P(M_1 \cap M_2)$ and $P(M_1)*P(M_2)$ is a measure value of the degree of statistical dependence between $M_1$ and $M_2$. The log of this ratio is the amount of information that a user acquires about presence of $M_1$ when the user observes $M_2$. Since Equation (1) is symmetrical, it is also the amount of information that the user acquires about presence of $M_2$ when the user observes $M_1$.

Based on the detected named entities, features of the plurality of query logs are generated (Step 402). Each query with a candidate named entity is represented as a feature vector using some general text features.

Table 1 shows features of describing query feature vectors. As shown in Table 1, basic text mining features can be used as query input visible variables. The features are descriptors or characteristic attributes of words designed for describing query feature vectors. For example, the features for word count or n-gram of the query text are bag-of-words.

TABLE 1

Features of describing query feature vectors

| Features | Examples |
| --- | --- |
| bag-of-words | word count |
| | n-gram of the query text |
| case | start with a capital letter |
| | word is all upper-cased |
| | word is mixed-cased |
| punctuation | abbreviation (end with a period, or has an internal period) |
| | internal hyphen |
| named entity | named entity length |
| lookups | named entity bag-of-words |
| part-of-speech | POS for each words in text |
| | POS sequence for bi-gram |
| | POS sequence for detected named entity |
| | POS for the context of the named entity |
| position | named entity position in the query |
| | first word |
| | last word |

A multimodal restricted boltzmann machine (RBM) is applied on the generated features of the plurality of query logs to generate a plurality of public query representations (Step 403).

Figure 5:
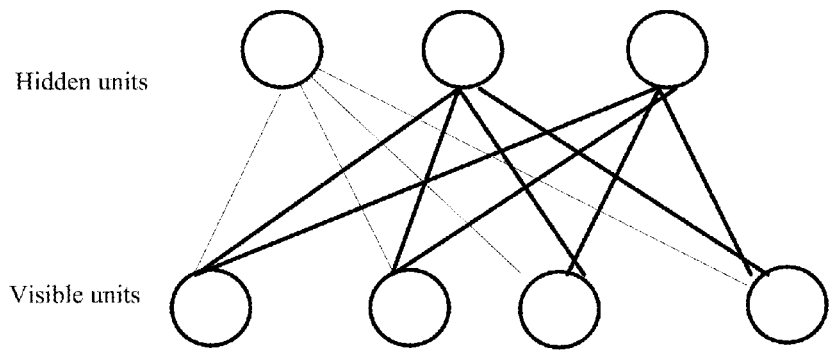
FIG. 5 illustrates an exemplary restricted boltzmann machine (RBM) consistent with the disclosed embodiments.

The restricted boltzmann machine (RBM) is an undirected model containing a visible layer and a hidden layer. FIG. 5 illustrates an exemplary restricted boltzmann machine (RBM) consistent with the disclosed embodiments. As shown in FIG. 5, a visible layer contains multiple visible units (also called visible variables) that represent observed data. While a hidden layer contains multiple hidden units (also called hidden variables), which can be features or representations of the visible layer. That is, the RBM includes one layer of hidden units (i.e., latent factors that the system tries to learn) and one layer of visible units.

Connections between visible units and hidden units are symmetric, but there's no connection between hidden units or visible units. That is, the RBM consists of a layer of visible units and a layer of hidden units with no visible-visible or hidden-hidden connections. Each visible unit is connected to all the hidden units (this connection is undirected, so each hidden unit is also connected to all the visible units). Between the hidden layer and the visible layer, there is a symmetric matrix of weights $W=(w_{i,j})$ that connects the visible unit $v_i$ and the hidden unit $h_j$. In addition, there are two other kinds of variables $a_i$ and $b_j$. The bias weight $a_i$ is for the visible units, and the bias weight $b_j$ is for the hidden units.

In the RBM, the hidden unit activations are mutually independent given the visible unit activations and conversely, and the visible unit activations are mutually independent given the hidden unit activations. $w_{i,j}$ is the weight of the connection between i and j and is initiated according to a normal distribution $N(0,0.01)$. Then, each iteration of the RBM includes the following process.

The nodes are random variables whose states depend on the state of the other nodes they are connected to. Both the visible nodes and the hidden nodes are binary units ($v \in \{0,1\}^D$, $h \in \{0,1\}^D$). The RBM defines a joint distribution of v and h based on the following energy function:

$$E(v,h;\theta)=-\Sigma_{i=1}^{D}\Sigma_{j=1}^{F}v_{i}W_{ij}h_{j}-\Sigma_{i=1}^{D}b_{i}v_{i}-\Sigma_{j=1}^{F}a_{j}h_{j} \quad (2)$$

where $v_i$ is a binary state of visible unit i; $h_j$ is a binary state of hidden unit j; and $W_{i,j}$ is a weight of the connection between the visible unit i and the hidden unit j.

Parameters $\theta=\{a, b, W\}$ are what the model is going to learn, where b and a are the intercept vectors for the visible and hidden layers, respectively.

The joint probability distribution over the hidden and visible units through the energy function (2) is defined as:

$$P(v, h; \theta) = \frac{1}{Z(\theta)}\exp(-E(v, h; \theta)), \text{ and } Z(\theta) = \sum_{v,h} e^{-E(v,h;\theta)} \quad (3)$$

The normalizing factor Z is called the partition function by analogy with physical systems. The RBM uses the contrastive divergence to learn the model parameters $\theta=\{a, b, W\}$. When using the energy function, the conditional distribution given hidden unit $h_j$ or visible unit $v_i$ respectively are defined by:

$$P(h_j=1|v,\theta)=\text{sigmoid}(b_j+\Sigma_i v_i W_{ij}) \quad (4)$$

$$P(v_i=1|h,\theta)=\text{sigmoid}(a_i+\Sigma_j W_{ij}h_j) \quad (5)$$

where the weight $w_{i,j}$ is initiated according to a normal distribution $N(0,0.01)$; sigmoid (x) denotes the logistic sigmoid function $\sigma(x)=1/(1+\exp(-x))$; the bias weight $a_i$ for the hidden units is initiated as 0; the bias weight $b_j$ for the visible units is initiated as 1.0/N; and N is the number of visible nodes in total.

Figure 6:
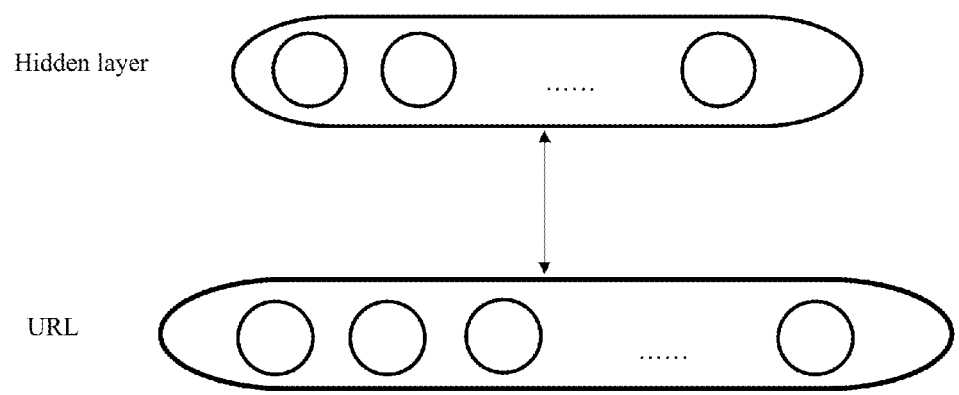
FIG. 6 illustrates an exemplary restricted boltzmann machine (RBM) trained with URL data consistent with the disclosed embodiments.

The multiple visible units may be URL data or query text data that represents observed data. FIG. 6 illustrates an exemplary restricted boltzmann machine (RBM) trained with URL data consistent with the disclosed embodiments. As shown in FIG. 6, the RBM is an undirected model containing a visible layer and a hidden layer. The visible layer contains multiple visible units (i.e. URL data) that represent observed data. Thus, the RBM can be trained with the URL data.

Figure 7:
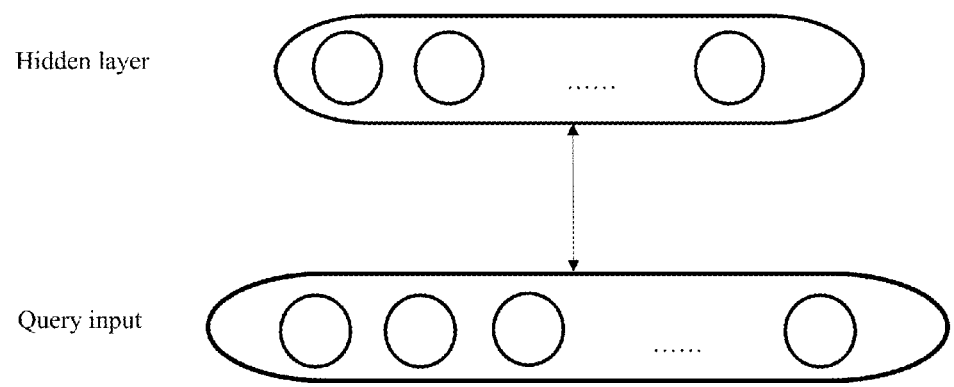
FIG. 7 illustrates an exemplary restricted boltzmann machine (RBM) trained with query text data consistent with the disclosed embodiments.

FIG. 7 illustrates an exemplary restricted boltzmann machine (RBM) trained with query text data consistent with the disclosed embodiments. As shown in FIG. 7, the RBM is an undirected model containing a visible layer and a hidden layer. The visible layer contains multiple visible units (i.e. query text data) that represent observed data. Thus, the RBM can be trained with the query text data.

However, task data is not always one dimension in real word. For example, data in query logs is not a nature way to combine the URL and text together to learn a RBM model. The representations of different modalities of data separately are modeled and a unified representation is learned by outputs of the hidden units learned from the model. Different models (e.g., Gaussian RBM) can process various input types (e.g., real value or word count). Even though the model trains the data of different modalities separately and adds another layer to output the general representation, the data is still easy to be trained by contrastive divergence, and has fast approximate inference.

In the multiple modalities settings, the data may include multiple input types, and each input type provides different kinds of information and uses different kinds of representations. The multimodal RBM is a general model to learn data representations with multiple types. To show how the multimodal RBM model works, the user intent mining from query logs can be used as an example. In the query logs, query text can be represented as word count vectors, while the URL is a binary vector. Without a multimodal configuration, it's much difficult to learn the relationship from data with multiple input types than data with a single input type.

Figure 8:
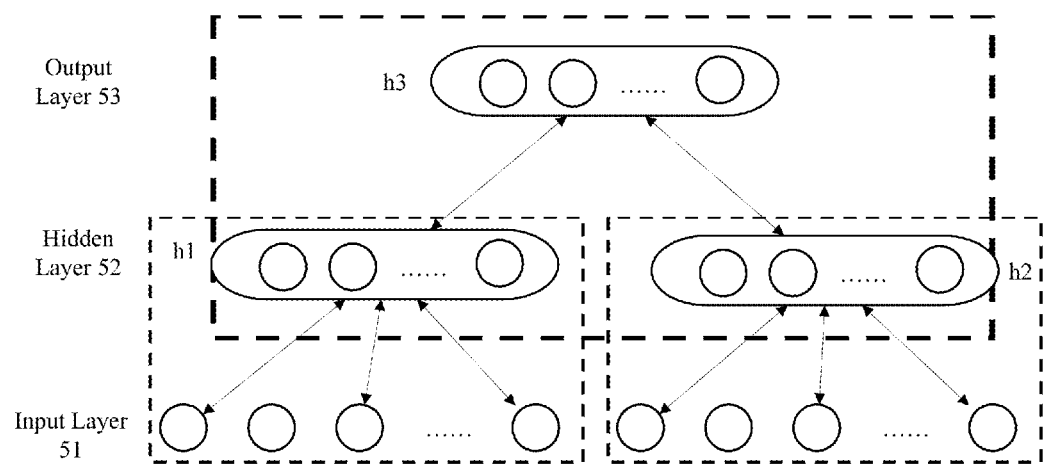
FIG. 8 illustrates an exemplary multimodal learning system for multiple input type data consistent with the disclosed embodiments.

FIG. 8 illustrates an exemplary multimodal learning system for multiple input type data consistent with the disclosed embodiments. As shown in FIG. 8, a multimodal learning system for multiple input type data may include an input layer 51, a hidden layer 52 (i.e., h1 hidden layer and h2 hidden layer), and an output layer 53 (i.e., h3 hidden layer).

The multimodal learning system is developed by training a RBM over the pre-trained layers for each input modality. The hidden layer 52 for each input modality is used as an input layer to train the output layer 53 (i.e., a higher output layer h3). Each dot square in FIG. 8 is a single RBM trained separately. Parameters for this model are $\theta=(\theta_1, \theta_2, \theta_3)$ and the parameters can be learned separately.

Thus, by learning from a public query log dataset using multimodal RBM, intent relationships between the users and the websites as well as the general representations of the queries can be learned.

Returning to FIG. 4, a public multimodal RBM can be trained on both the query features and uniform resource locators (URLs) (Step 404). The public multimodal RBM model can process data with multiple input types. That is, the multimodal RBM model can learn potential relationships between multiple modalities of the input.

Further, a search query from a user is received (Step 405). For example, the user may input the search query on a search bar in a browser installed in a mobile phone or a PC.

The system determines whether there are a plurality of history queries of the user (Step 406). Many traditional personalization algorithms used in current search engines have a lot of limitations. It is a challenge to acquire adequate user information because of privacy issues. Therefore, many studies seek solutions by developing group level personalization, which combines limited individual information with other related people to perform a collaborative filtering. But finding similar users to enrich personalization is also a challenge because of data sparsity and distance calculation among all users.

Moreover, the user information suffers from great imbalance. The imbalance amount of user personal data is resulted from various reasons, but a scenario is that some users may have plenty of online activity records while others may have no online activity records. Therefore, this requires the model to be flexible enough to fit different scenarios. When there's no personal data of the user, the model can learn to mine the user intent from the public query log dataset. It may scale up personalized model training when there's adequate individual data. The multimodal RBM model is applied to learn the user intent in two scenarios: the search query from the user without history records and the search query from the user with the history records.

If there is no history query of the user (Step 406, No), the process goes to Step 409. On the other hand, if there are the plurality of history queries (Step 406, Yes), the public multimodal RBM is applied on the plurality of history queries of the user to train a personalized multimodal RBM (Step 407). That is, for the user with the history records, the data from all the relevant users can be applied to train a personalize model to predict what the user is looking for.

Specifically, to fulfill the personalization need, the individual log history is used to find the relevant users that have similar interests. As used herein, the user refers to data examples with a same section ID. At least one personal query representation for learning from the public query log dataset can be calculated. Then, the calculated personal query representation is compared with the plurality of public query representations to find the relevant users that have the similar interests with this user. Because the generated personal query representation is binary and the generated personal query representation is not sparse as raw data, calculation is more efficient. More personal data (i.e., history queries of the user) can improve the accuracy of predicting the user intent by finding more relevant users.

Figure 9:
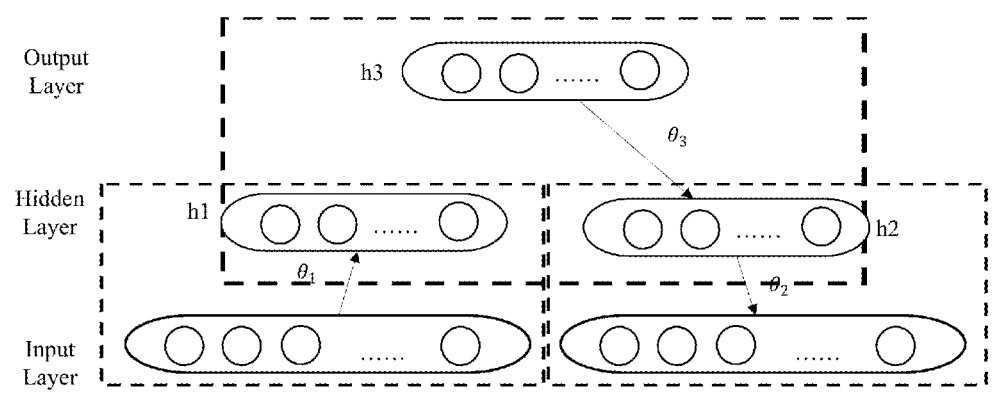
FIG. 9 illustrates an exemplary multimodal RBM model to predict the user intent consistent with the disclosed embodiments.

Thus, the personalized multimodal RBM or public multimodal RBM for learning the user intent can be built. Further, when there are the plurality of history queries, the user intent is predicted using the personalized multimodal RBM (Step 408). When there is no history query of the user, the user intent is predicted using the public multimodal RBM (Step 409). FIG. 9 illustrates an exemplary multimodal RBM model to predict the user intent (i.e., what the user is looking for).

As shown in FIG. 9, the multimodal RBM model may include an input layer, a hidden layer, and an output layer. The multimodal RBM model may be a public multimodal RBM or a personalized multimodal RBM. Each similar named entity has one or more activated visible units that represent the URLs in the input layer, and the selected URL is the URL that is voted by most of the similar named entities.

Provided that a feature vector represents the query text, the query representation can be defined by:

$$P(h_1|v,\theta_1)=\text{sigmoid}(b+vW) \quad (6)$$

This query representation can be compared with all other representations that have learned from the query log dataset to obtain a list of named entities that have the biggest similarity with the named entity the user is looking for.

The hidden units in $h_2$ that are activated can also be obtained by these similar named entities. Thus, the most possible URL that the user may want to click can be obtained by:

$$P(h_1|h_2,\theta_3)=\text{sigmoid}(a_3+W_3h_2) \quad (7)$$

$$P(v|h_1,\theta_2)=\text{sigmoid}(a_2+W_2h_1) \quad (8)$$

The results may also be presented to the user on, for example, the display on a user terminal, etc. Returning to FIG. 4, the system 300 may also determine whether the user continues inputting a new query (Step 410). If system 300 determines that the user continues inputting the new query (Step 410, Yes), the process 400 continues from Step 406. On the other hand, if system 300 determines that the user does not want to continue inputting another query (Step 410, No), the process 400 completes.

Figure 10:
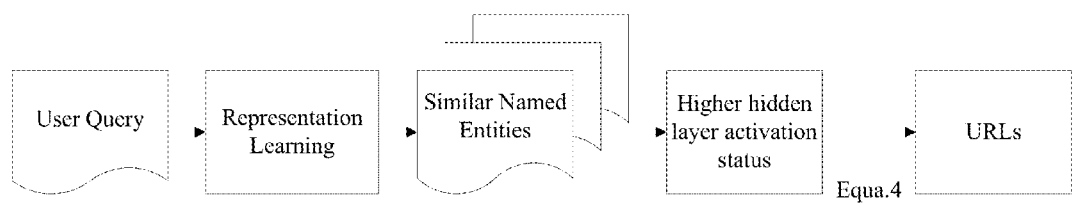
FIG. 10 illustrates an exemplary query process of user intent mining consistent with the disclosed embodiments.

FIG. 10 illustrates an exemplary query process of user intent mining when there are history queries of a user consistent with the disclosed embodiments. As shown in FIG. 10, at the beginning, the user inputs a new search query q. It is assumed that a public multimodal RBM model for learning the user intent is built using a plurality of queries in a public query log dataset from a website (e.g., Google search, Microsoft Bing search, Yahoo! search, etc.) before the search query from the user is received. The steps for generating a public multimodal RBM model are described in FIG. 4, which are not repeated herein.

When there are history queries of the user, the public multimodal RBM model can be used to generate general representation(s) of every query of the history queries of the user. Then, the generated query representations can be used to calculate similarity (i.e., similar named entities) with the queries in the public query log dataset. The sections' IDs of the queries with significant similarity are collected. The hidden units that are activated in a higher hidden layer can also be obtained by these similar named entities. Further, a new query dataset including a plurality of queries from the relevant users and a plurality of history queries of the user is built. A personalized multimodal RBM is generated by training the public multimodal RBM using the new query dataset. Thus, in the personalized multimodal RBM, the possible URL(s) that the user may want to click can be obtained by Equation (4).

This disclosed system works in an unsupervised manner, and is flexible to various scenarios regardless of the amount of individual information. In other words, this disclosed system can handle scenarios without personal history information or limited personal history information. The system outputs a binary representation for each query log. Thus, to some extent, the system can solve a data sparsity problem and reduce the computation complexity when looking for the relevant users with similar interests. Further, scalability of the disclosed system may be supported with multiple multimodal restricted boltzmann machines, which can be used in situations with or without user history data.

The disclosed systems and methods can also be applied to other devices with displays, such as smart phones, tablets, PCs, smart watches, and so on. That is, the disclosed methods not only can be used for systems for scalable user intent mining, but also can be applied as the core function for other systems, such as social media systems, other content recommendation systems, information retrieval systems, or any user interactive systems, and so on. For example, a user wants to buy 2014 NBA Chicago Bulls tickets. At the beginning, the user inputs a searching phrase "NBA basketball tickets" on a search bar in a browser installed in his/her mobile phone. After the search query (i.e., "NBA basketball tickets") from the user is received, a system determines whether there are history queries of the user in the last two hours. It is assumed that a public multimodal RBM is built for learning user intent is built using a plurality of queries in a public query log dataset. If there is no history query of the user, the user intent is predicted using the public multimodal RBM. That is, for the user without history records, the public multimodal RBM model can be applied to predict the user intent.

On the other hand, the user inputted "Chicago Bulls" and "Chicago Bulls tickets" in the last two hours (i.e., there are the plurality of history queries of the user). At this time, the public multimodal RBM is applied on history queries (i.e., "Chicago Bulls" and "Chicago Bulls tickets") of the user to train a personalized multimodal RBM. Further, for the user with the plurality of history records, the queries from all relevant users can be applied to train the personalized multimodal RBM model to predict what the user is looking for.

Specifically, the query representation generated from the history queries of the user can be used to calculate similarity (i.e., similar named entities) with the queries in the public query log dataset. The sections' IDs of the queries with significant similarity are collected. These IDs are regarded as the relevant users having at least one similar interest with the user. The relevant users may include a number of other users that searched for "2014 NBA Chicago Bulls schedule", "2014 NBA Chicago Bulls scores", "2014 NBA Chicago Bulls tickets", and/or "Chicago Bulls basketball player" within the last a few hours. Then, a new query dataset including a plurality of queries (e.g., "2014 NBA Chicago Bulls tickets") from the relevant users and the history queries (e.g., "Chicago Bulls") of the user is built. A personalized multimodal RBM is generated by training the public multimodal RBM using the new query dataset.

Further, the user intent is predicted using the personalized multimodal RBM. Based on the predicted user intent (e.g., the user wants to buy 2014 NBA Chicago Bulls tickets), a search engine can return at least one link (or URL) that the user is most likely interested in by implementing the model learning process. The user may click on the link (or URL) from the at least one link (or URL) to browse a webpage. Or the user may also input another searching phrase on the search bar in the browser to start another searching operation.

Further, the scalable multimodal learning systems may be integrated on smart TV systems and/or smart phones to help organize and share produced information valuable to assist in making purchasing decisions, choosing movies, choosing services and shops, renting DVDs, buying books, etc.

Other steps may be referred to above descriptions with respect to the system for scalable user intent mining. Other applications, advantages, alternations, modifications, or equivalents to the disclosed embodiments are obvious to those skilled in the art.

What is claimed is:

1. A method for scalable user intent mining implemented by at least one processor, comprising:
   detecting named entities from a plurality of query logs in a public query log dataset, wherein the public query log dataset stores the plurality of query logs from a plurality of websites;
   based on the detected named entities, generating corresponding features of the plurality of query logs;
   applying a multimodal restricted boltzmann machine (RBM) on the corresponding features of the plurality of query logs to train a public multimodal RBM;
   generating a plurality of public query representations;
   receiving a search query from a user;
   determining whether there are a plurality of history queries of the user;
   when there is no history query of the user, predicting user intent using the public multimodal RBM; and
   when there are the plurality of history queries of the user, applying the public multimodal RBM on the plurality of history queries of the user to train a personalized multimodal RBM, and predicting the user intent using the personalized multimodal RBM, so that an accuracy of predicting the user intent is improved by using the personalized multimodal RBM.

2. The method according to claim 1, wherein:
   the plurality of history queries of the user are the latest M search queries of the user within a pre-defined period of time, wherein M is an integer greater than 1.

3. The method according to claim 1, wherein applying the public multimodal RBM on the plurality of history queries of the user to train a personalized multimodal RBM further includes:
   detecting named entities from the plurality of history queries of the user;
   based on the detected named entities, generating corresponding features of the plurality of history queries of the user;
   generating at least one personal query representation of the plurality of history queries of the user using the public multimodal RBM;
   based on the at least one personal query representation, comparing the at least one personal query representation with the plurality of public query representations to find one or more relevant users that share at least one similar interest with the user; and training the public multimodal RBM using data from the one or more relevant users to generate the personalized multimodal RBM.

4. The method according to claim 1, further including:

based on the predicted user intent, presenting at least one search result to the user.

5. The method according to claim 3, wherein comparing the at least one personal query representation with the plurality of public query representations to find one or more relevant users that share at least one similar interest with the user further includes:

based on the at least one personal query representation, calculating similar named entities with the plurality of queries in the public query log dataset;

based on the calculated similar named entities, collecting identifications of sections of the plurality of queries with significant similar named entities, wherein the identifications of the sections are regarded as the relevant users having the at least one similar interest with the user; and based on the collected identifications of the sections, building a new dataset including the plurality of queries from the one or more relevant users and the plurality of history queries from the user.

6. The method according to claim 3, wherein detecting named entities from the plurality of history queries of the user further includes:

refining n-grams from the public query log dataset using pointwise mutual information, wherein n is an integer less than or equal to 7.

7. The method according to claim 6, wherein:

provided that of two candidate named entities $M_1$ and $M_2$ are two random variables, the pointwise mutual information of $M_1$ and $M_2$ is defined by:

$$PMI(M_1, M_2) = \log_2\left(\frac{P(M_1 \cap M_2)}{P(M_1) * P(M_2)}\right) = \log_2\left(\frac{\frac{C(M_1 \cap M_2)}{N}}{\frac{C(M_1)}{N} * \frac{C(M_2)}{N}}\right)$$

wherein $P(M_1 \cap M_2)$ is a probability that $M_1$ and $M_2$ co-occur; and $P(M_1)*P(M_2)$ is a probability that $M_1$ and $M_2$ co-occur when $M_1$ and $M_2$ are statistically independent.

8. A system for scalable user intent mining, comprising at least one processor, at least one memory, and at least one program stored in the memory and to be executed by the at least one processor, wherein the at least one processor executes the at least one program to:

detect named entities from a plurality of query logs in a public query log dataset;

generate corresponding features of the plurality of query logs based on the detected named entities;

apply a multimodal restricted boltzmann machine (RBM) on the generated features of the plurality of query logs in the public query log dataset to generate a plurality of public query representations;

apply the multimodal RBM on a plurality of history queries of the user to train a personalized multimodal RBM; and predict user intent using one of the public multimodal RBM and the personalized multimodal RBM, so that an accuracy of predicting the user intent is improved by using the personalized multimodal RBM.

9. The system according to claim 8, wherein:

the plurality of history queries of the user are the latest M search queries of the user within a pre-defined period of time, wherein M is an integer greater than 1.

10. The system according to claim 8, wherein applying the multimodal RBM on a plurality of history queries of the user to train a personalized multimodal RBM further includes:

detecting named entities from the plurality of history queries of the user;

generating corresponding features of the plurality of history queries of the user based on the detected named entities;

generating personal query representations of the plurality of history queries of the user using the public multimodal RBM learned from the public query log dataset; and training the personalized multimodal RBM using a plurality of queries for personality learning, wherein the plurality of queries for personality learning include a plurality of queries from one or more relevant users and the plurality of history queries.

11. The system according to claim 8, wherein:

based on the predicted user intent, at least one search result is presented to the user.

12. The system according to claim 8, wherein:

n-grams from the public query log dataset are refined by using pointwise mutual information, wherein n is an integer less than or equal to 7.

13. The system according to claim 11, wherein:

provided that two candidate named entities $M_1$ and $M_2$ are two random variables, the pointwise mutual information of $M_1$ and $M_2$ is defined by:

$$PMI(M_1, M_2) = \log_2\left(\frac{P(M_1 \cap M_2)}{P(M_1) * P(M_2)}\right) = \log_2\left(\frac{\frac{C(M_1 \cap M_2)}{N}}{\frac{C(M_1)}{N} * \frac{C(M_2)}{N}}\right)$$

wherein $P(M_1 \cap M_2)$ is a probability that $M_1$ and $M_2$ co-occur; and $P(M_1)*P(M_2)$ is a probability that $M_1$ and $M_2$ co-occur when $M_1$ and $M_2$ are statistically independent.

14. A non-transitory computer readable storage medium storing computer-executable instructions to execute operations for scalable user intent mining, the computer-executable instructions comprising:

detecting named entities from a plurality of query logs in a public query log dataset;

based on the detected named entities, generating corresponding features of the plurality of query logs;

applying a multimodal restricted boltzmann machine (RBM) on the generated features of the plurality of query logs to train a public multimodal RBM;

generating a plurality of public query representations;

receiving a search query from a user;

determining whether there are a plurality of history queries of the user;

when there is no history query of the user, predicting user intent using the public multimodal RBM; and when there are the plurality of history queries of the user, applying the public multimodal RBM on the plurality of history queries of the user to train a personalized multimodal RBM, and predicting the user intent using the personalized multimodal RBM, so that an accuracy of predicting the user intent is improved by using the personalized multimodal RBM.

15. The non-transitory computer readable storage medium according to claim 14, wherein:
the plurality of history queries of the user are the latest M search queries of the user within a pre-defined period of time, wherein M is an integer greater than 1.

16. The non-transitory computer readable storage medium according to claim 14, wherein:
based on the predicted user intent, at least one search result is presented to the user.

17. The non-transitory computer readable storage medium according to claim 14, wherein:
n-grams from the public query log dataset are refined by using pointwise mutual information, wherein n is an integer less than or equal to 7.

18. The non-transitory computer readable storage medium according to claim 17, wherein:
provided that two candidate named entities $M_1$ and $M_2$ are two random variables, the pointwise mutual information of $M_1$ and $M_2$ is defined by:

$$PMI(M_1, M_2) = \log_2\left(\frac{P(M_1 \cap M_2)}{P(M_1) * P(M_2)}\right) = \log_2\left(\frac{\frac{C(M_1 \cap M_2)}{N}}{\frac{C(M_1)}{N} * \frac{C(M_2)}{N}}\right)$$

wherein $P(M_1 \cap M_2)$ is a probability that $M_1$ and $M_2$ co-occur; and $P(M_1)*P(M_2)$ is a probability that $M_1$ and $M_2$ co-occur when $M_1$ and $M_2$ are statistically independent.

\* \* \* \* \*